United States Patent [19]

Larsen et al.

[11] Patent Number: 5,548,929
[45] Date of Patent: Aug. 27, 1996

[54] WINDOW SEALING ASSEMBLY

[75] Inventors: Douglas C. Larsen, Highland, Mich.;
Forrest K. Keller, Goldsboro, N.C.;
Lawrence L. Warren, Birmingham,
Mich.

[73] Assignee: The Standard Products Company,
Cleveland, Ohio

[21] Appl. No.: 349,020

[22] Filed: Dec. 2, 1994

[51] Int. Cl.$^6$ ...................................................... E06B 7/16
[52] U.S. Cl. ............................... 49/441; 24/297; 24/590;
24/697.1
[58] Field of Search .......................... 49/441, 440, 479.1,
49/484.1, 490.1, 492.1, 498.1; 24/297,
453, 697.1, 590; 52/717.01

[56] References Cited

U.S. PATENT DOCUMENTS

| | | | |
|---|---|---|---|
| 2,169,503 | 8/1939 | Schlegel | 49/492.1 X |
| 2,943,825 | 7/1960 | Lane | 49/492.1 X |
| 3,059,292 | 10/1962 | Harris | 49/492.1 |
| 3,080,629 | 3/1963 | Meijer . | |
| 3,230,592 | 1/1966 | Hosea . | |
| 3,634,991 | 1/1972 | Barton, Jr. et al. . | |
| 4,409,756 | 10/1983 | Audenino et al. | 49/440 |
| 4,667,442 | 5/1987 | Hiramatsu et al. | 49/441 |
| 4,739,543 | 4/1988 | Harris, Jr. . | |
| 4,800,681 | 1/1989 | Skillen et al. | 49/440 |
| 4,864,774 | 9/1989 | Onishi et al. | 49/440 |
| 4,951,418 | 8/1990 | Keys . | |
| 5,010,689 | 4/1991 | Vaughan . | |
| 5,013,379 | 5/1991 | Brooks et al. | 49/441 X |
| 5,085,024 | 2/1992 | Emmons et al. . | |
| 5,195,274 | 3/1993 | Mishima et al. | 49/441 |
| 5,288,530 | 2/1994 | Maki . | |
| 5,289,658 | 3/1994 | Lusen et al. | 49/492.1 |
| 5,317,835 | 6/1994 | Dupuy et al. | 49/441 |

Primary Examiner—Philip C. Kannan
Attorney, Agent, or Firm—Harness, Dickey & Pierce, P.L.C.

[57] ABSTRACT

A window seal assembly for attachment to a vehicle door around the door's window opening is provided. The window seal assembly includes a glass run channel and an inner flock seal both formed from extruded rubber or plastic and including metallic reinforcements. The glass run channel portion is attached to the frame along the pillars via a plurality of fasteners and the inner flock seal fits over a flange extending from the frame. Both the glass run channel and the inner flock seal include lips extending relatively toward the other to form a window pane receiving channel.

26 Claims, 6 Drawing Sheets

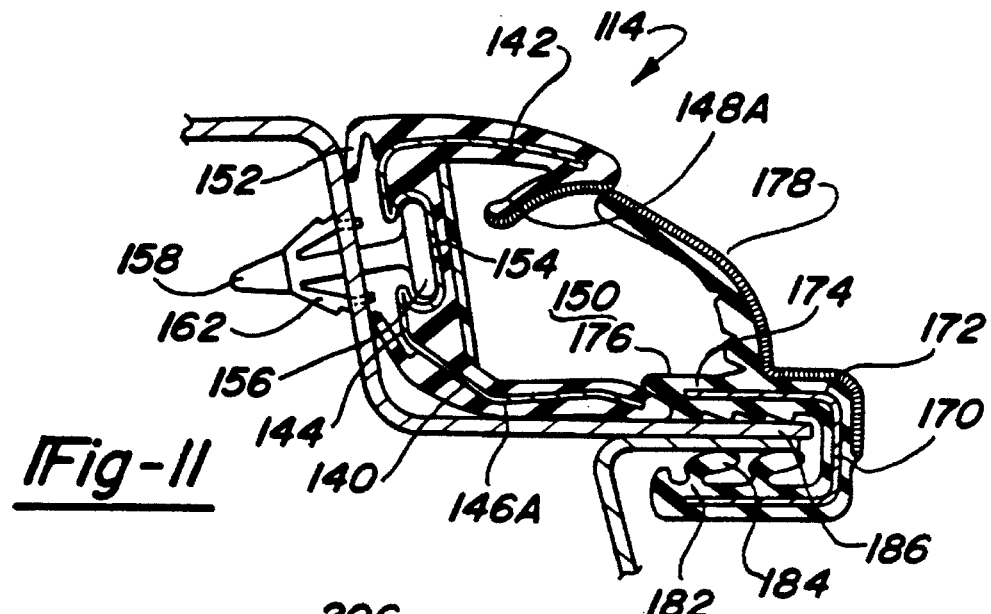
_Fig-11_
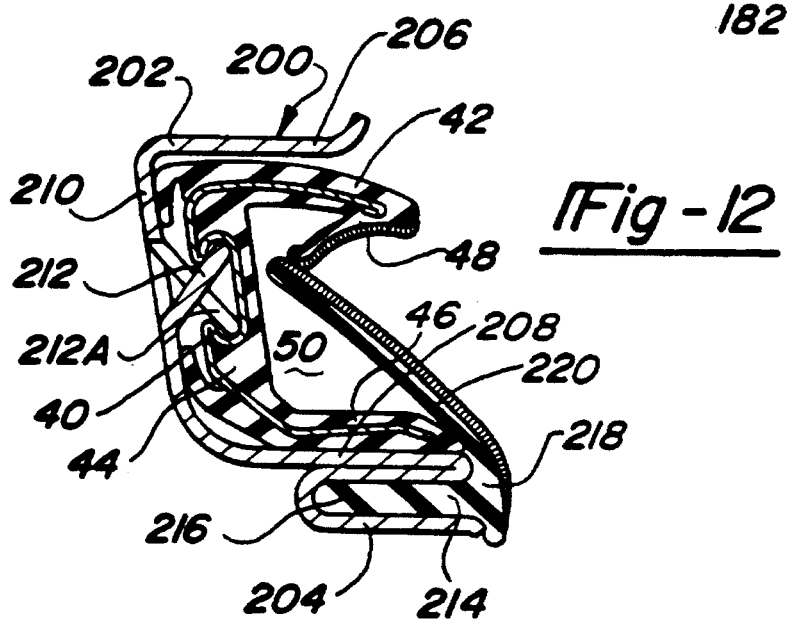
_Fig-12_
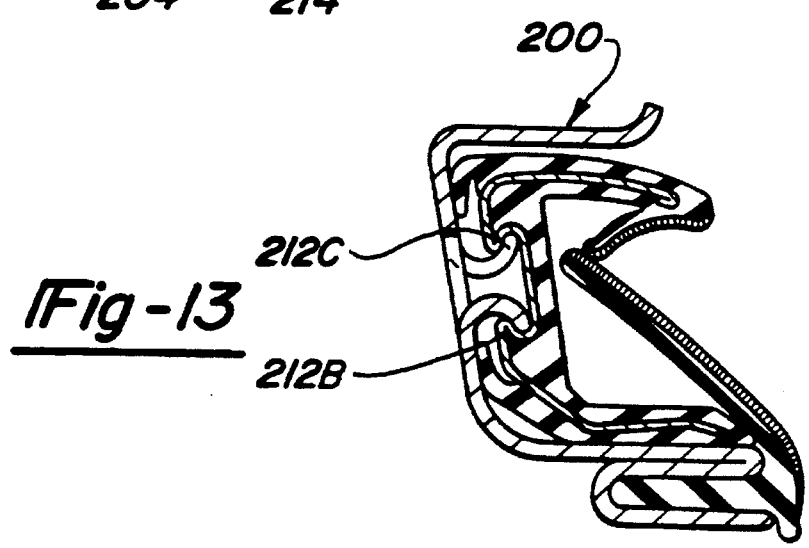
_Fig-13_

WINDOW SEALING ASSEMBLY

BACKGROUND OF THE INVENTION

The present invention relates in general to a window sealing assembly, and more particularly, to a window sealing assembly including a glass run channel and an inner flock seal which cooperate to provide a high quality seal around a vehicle door window opening. The window sealing assembly can be used around front or rear door window openings to provide a seal for a movable pane of window glass. To reduce wind noise the window seal assembly of the present invention allows the window pane to be disposed substantially adjacent with the vehicle door flange to produce a flush relationship.

In general, inner flock seals are formed by molding together multiple pieces with corner mold sections. This is necessary since most one piece extrusions cannot satisfactorily bend around a typical corner without losing shape and becoming distorted. Similarly, when two pieces of a glass run extrusion are inserted into an injection mold and joined with an elastomeric material the result is an interruption in the sealing lip. The molded area of the sealing lip has to be hand flocked in a laborious secondary operation. This interruption causes two discontinuities in the sealing surface at the knit line between the extrusion and the mold compound. In addition, this lip is molded in a position which has less interference to the glass and thus less seal pressure. Generally, a compromise is struck between seal pressure and durability with adverse effects on wind noise and sealing ability in the corner areas.

With regard to glass run channels, numerous attempts have been made to better secure the glass run channel to a vehicle door flange. However, many of the glass run channels currently in use are unnecessarily complicated in terms of structure and unduly expensive to manufacture. There is a need therefore for a window sealing assembly which has a significant interface at the corners and which is securely attached to the vehicle door flange.

SUMMARY OF THE INVENTION

A common feature of automobile doors is a pane of window glass which can be raised and lowered. Conventionally, the windowpane follows a generally vertically extending glass run channel defined by a channel shaped molding within the door frame and the top edge of the pane engages a substantially horizontally extending header portion of the glass run channel. The glass run channel disposed along the vertically extending pillars is normally lined with flocking which allows the glass pane to slide therein. The glass run channel also protects the pane from damage due to vibration and seals the edges of the pane.

In the most common types of movable automotive windows, the edges of the windowpane are centered in the side and top glass run channel legs with the plane of the outer surface of the window pane noticeably offset from the plane of the outer skin surface of the automobile body. However, this arrangement detracts from the overall appearance of the automotive vehicle and disrupts the laminar flow of air around the vehicle body, resulting in unnecessary aerodynamic drag and unpleasant noise. Recently, there has been increasing interest in the automotive industry for vehicles with window panes having outer surfaces which are substantially coplanar with adjacent vehicle body surfaces. This arrangement is generally referred to as "flush" glass or "semi-flush" glass and is desirable for enhancing vehicle appearance and laminar airflow by reducing aerodynamic drag and wind noise.

Several patents disclose the feature of providing a window which is flush or nearly flush with adjacent vehicle body surfaces. Examples of such patents include: U.S. Pat. No. 4,409,756, Oct. 18, 1983 to Audenina, et al.; U.S. Pat. No. 4,562,676, Jan. 7, 1986 to Kruschwitz; U.S. Pat. No. 4,455,785, Jun. 26, 1984 to Wahr, et al.; and U.S. Pat. No. 4,457,111, Jul. 3, 1984 to Koike.

Although flush and semi-flush glass run channel moldings are known, there remains a need for improved glass run channel moldings. Glass run channel moldings must securely retain the window pane while allowing the pane to slide easily in the channel during its raising and lowering. Glass run channels must also seal the interior of the car against noise and weather and minimize window vibration. Glass run channel moldings are also desirably inexpensive to manufacture and easily installed during manufacture of the vehicle. Accordingly, it is an object of the present invention to provide the art with a new and improved glass run channel which can be used in association with a cooperating inner flock seal to accomplish these and other objectives.

Under the present invention, there is provided a window sealing assembly for a movable pane of window glass, comprising a glass run channel having a metallic core including a slot extending from the web portion for retaining means for mechanically attaching the glass run channel to the vehicle. Typically the retaining means are in the form of either fasteners or a clip depending upon the embodiment. The fasteners can extend from the A, B and C pillar portions of glass run channel depending upon whether the window seal assembly is for the front or rear window opening. The fasteners are positioned along the slots and inserted through apertures contained along the vehicle door window opening frame to accomplish attachment of the glass run channel. Additionally, each pillar section of the glass run channel includes a layer of high molecular weight polyethylene disposed along the web of the U-shaped window receiving channel to decrease friction during movement of the window pane.

The header portion of the glass run channel includes flexible projections which extend outwardly along the web of the glass run channel and fit securely within locking spaces provided along the door frame to secure the glass run channel as is common with many header portion glass run channels. The header portion is provided with a band of spongy material which extends across the window pane receiving channel to preclude damage to the window pane upon excessive closure.

In addition to the glass run channel, a complimentary continuous inner flock seal is provided to seal the inner surface of the window pane when the window pane is adjusted to close the window opening. This inner flock seal which extends from the belt-line at both first and second ends is mounted over an extending flange provided along the vehicle door window opening and includes an extending lip which extends substantially across the U-shaped window receiving channel when the window pane is maintained in a down position. The unique shape of the inner flock seal provides maximum seal contact to the glass while cornering at a very tight radius without wrinkling. Additionally, since the inner flock seal tips toward the glass along the corners, the inner flock seal applies more pressure to the glass pane than along the straight section. This is especially important since corners have traditionally been difficult areas to seal.

Together the glass run channel and inner flock seal cooperate to form a high quality window sealing assembly according to the teachings of the present invention.

The objects and advantages of the present invention should become apparent to those skilled in the art in light of the description of the appended claims, taken in conjunction with the accompanying drawings.

BRIEF DESCRIPTION OF THE DRAWINGS

FIG. 11 is a cross sectional view taken along line 11—11 of FIG. 8 demonstrating the window seal assembly mounted along the "B" pillar of the automotive vehicle rear door window opening;

FIG. 12 is a cross sectional view taken along line 12—12 of FIG. 2 demonstrating the metallic bracket which is used to mount the glass run channel adjacent the vehicle door frame below the belt line;

FIG. 13 is a cross sectional view of an alternative embodiment of the bracket illustrated in FIG. 11;

DETAILED DESCRIPTION OF THE PREFERRED EMBODIMENT

Figure 1:
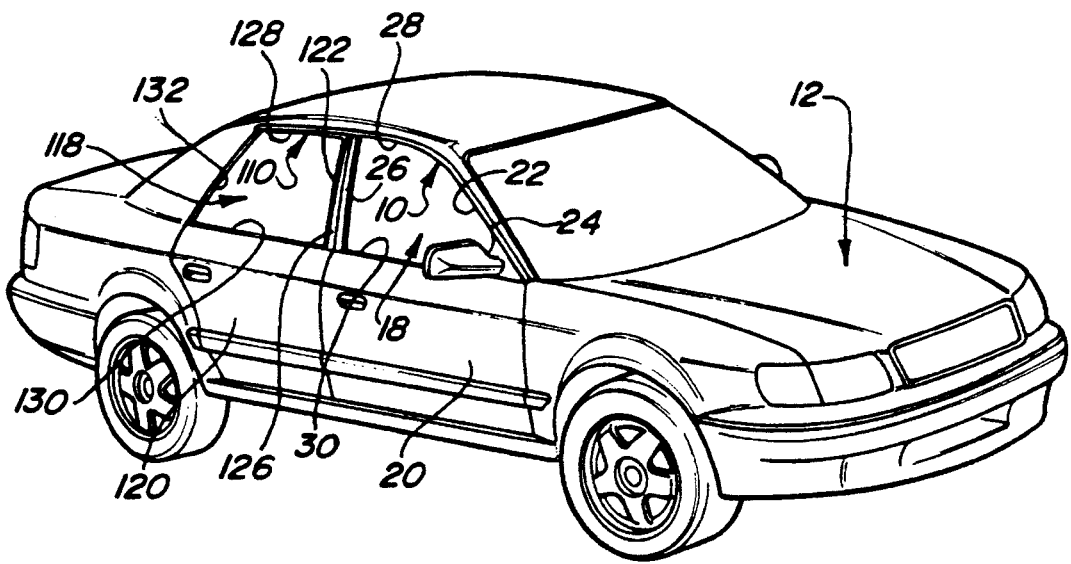
FIG. 1 is a perspective view of an automotive vehicle incorporating the window seal assembly of the present invention.

In accordance with the present invention there is provided a first window seal assembly embodiment 10 as illustrated in FIG. 2 through 7 for an automotive vehicle 12 which includes a glass run channel 14 and an inner flock seal 16 which cooperatively receive a moveable window pane 18 within the window opening 22 when the window pane 18 is in an at least partially closed position. The window seal assembly 10 is applicable generally along the window opening 22 of the forward most door 20 of the automotive vehicle. The window opening 22 is defined by an A pillar 24 and a B pillar 26 which are separated along the top by a header portion 28. Extending along the base of the window opening 22 is the belt line 30. Similarly, a second window seal embodiment 110 as illustrated in FIG. 2 and FIGS. 8 through 11 for use along the window opening 122 of the rearward door 120 is also included in accordance with the teachings of the present invention. The window opening 122 includes a B pillar 126 and a C pillar 132 separated along the top by a header portion 128 and along the bottom by a belt line 130. While the present invention is being described for exemplary purposes with regard to an automobile it should be understood by those skilled in the art that the window sealing assembly embodiments can be employed on other automotive vehicles as well. Further, it should also be understood by those skilled in the art that the embodiment disclosed herein for use on the forward most door is equally useful for 2-door vehicle models.

Figure 2:
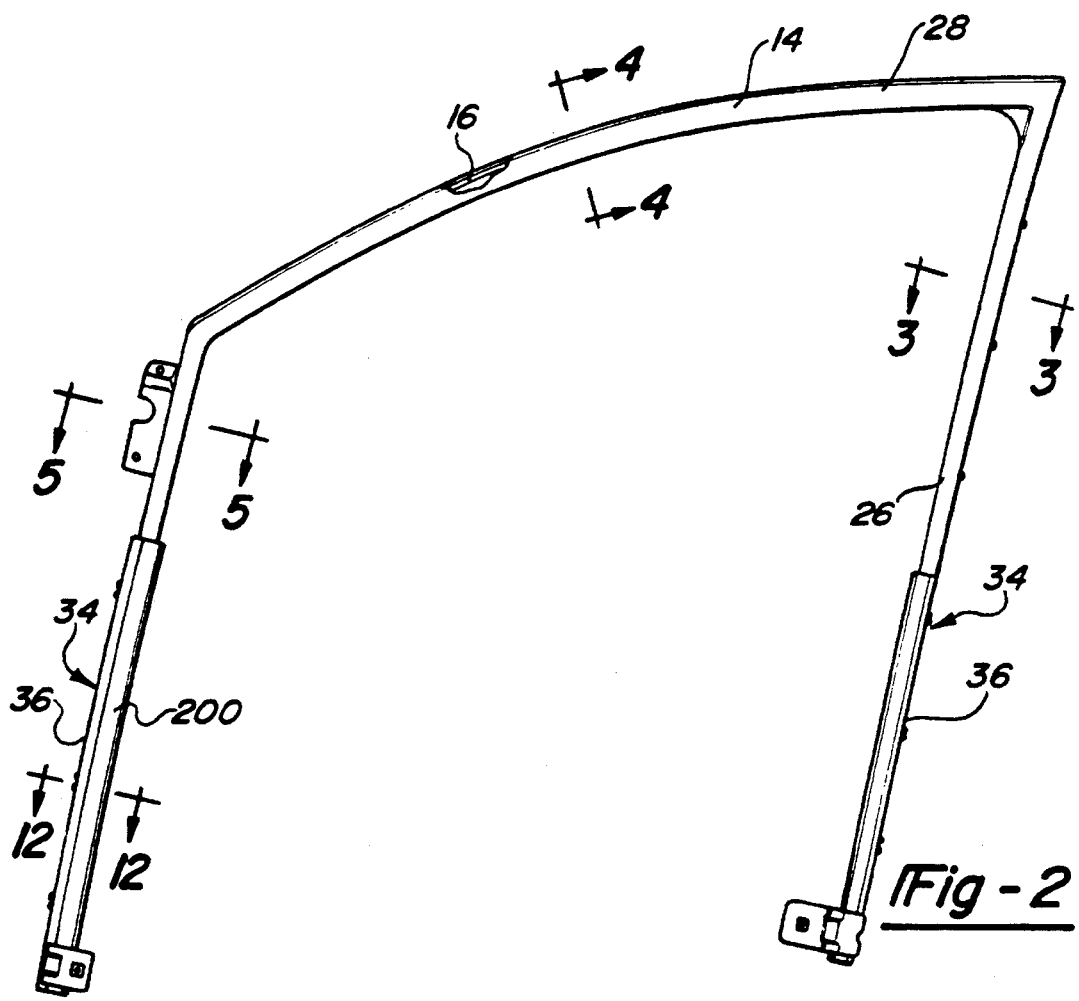
FIG. 2, is a side elevational view, partially cut away, of the window seal assembly for the front door of an automotive vehicle.

Referring to FIG. 2 a side elevational view, partially cut away, of the window seal assembly 10 for the forward most door of an automotive vehicle is provided. As noted the window seal assembly 10 includes a glass run channel portion 14 and an inner flock seal 16, as shown more clearly in FIGS. 3 through 5, which cooperate to seal the window pane 18 when the window pane is in a closed position. The seal assembly 10 is generally provided with metallic brackets 34 disposed along the lower ends 36 of the glass run channel 14 to directly attach the lower end of glass run channel 14 to a standard vehicle door flange (not shown) disposed below the belt-line 30 as will subsequently be described in more detail.

Figure 3:
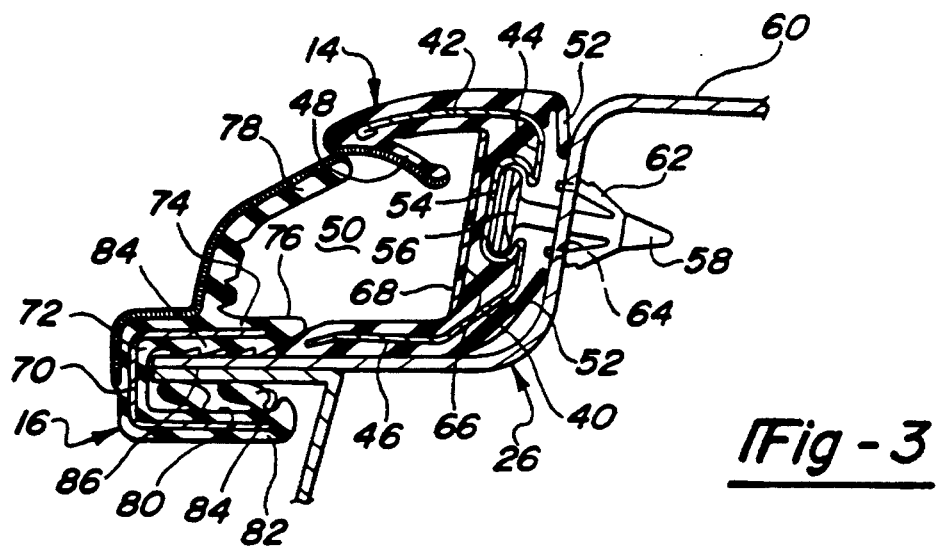
FIG. 3 is a cross sectional view taken along line 3—3 of FIG. 2 demonstrating the window seal assembly mounted along the "B" pillar of the automotive vehicle door window opening.

Referring to FIG. 3 a cross-sectional view taken along line 3—3 of FIG. 2 is provided. According to FIG. 3 the cross-sectional view illustrates the portion of the window seal assembly 10 which is located along the B pillar section 26. The glass run channel 14 at the B pillar section 26 generally comprises a support core 40 which is embedded within an elastomeric cover which can comprise, for example, EPDM rubber or another elastomeric or polymeric material. The support core is preferably made of stainless steel or another metallic material, such as coated aluminum or steel, and is formed into a substantial U-shape including a first, inner leg 46, a web 44 and a second, outer leg 42 to thereby define a glass run channel. Glass run channel 14 has a conventional elastomeric glass run rib 48 which extends from the outer leg 42 into the window pane receiving channel 50. The portion of elastomeric cover extending beyond the web 44 away from the inner and outer legs includes conventional sealing lips 52.

Disposed along the web 44 is a C-shaped slot 54 formed in the support core 40 for retaining the head 56 of at least one fastener 58. Preferably, a plurality of fasteners 58 are utilized to mechanically fasten the glass run channel to the outer panel 60 of the vehicle door frame. The fastener heads 56 are slid into the slot 54 prior to extruding the corner portion of the glass run channel which connects the B pillar to the header portion. By way of example, Christmas tree fasteners as shown may be utilized. As the glass run channel is positioned contiguously against the outer panel such that fasteners 58 are aligned with the apertures 64, the fastener wings 62 are inserted through the apertures 64 allowing the wings 62 expand thereby securing the fasteners.

Preferably, the backing wall 66 of the window receiving channel 50 is coated with a layer of polymeric material 68 such as, for example, high molecular weight polyethylene to decrease friction during movement of the window pane and to enhance the overall wearability of the glass run channel. Since high molecular weight polyethylene readily bonds to EPDM rubber it has proven to be particularly useful.

Optionally, instead of utilizing a plurality of individual fasteners as discussed above, a sliding relatively flat elongated track 224 including a plurality of spaced apart fasteners 226 can be utilized to retain the glass run channel contiguously against the outer panel of the vehicle door frame along one or more pillars. Preferably, although not essentially, the fasteners 226 which extend from the track 224 have a geometry similar to those disclosed in copending U.S. patent application Ser. No. 08/227,065 filed Apr. 13, 1994, which is expressly incorporated herein by reference.

Figure 16:
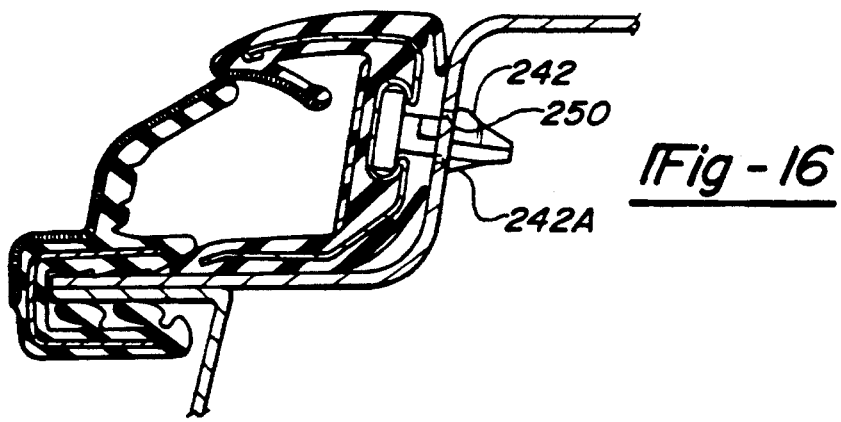
FIG. 16 is a cross sectional view illustrating the track member of FIG. 15 incorporated into the C-shaped slot of the glass run channel to secure the glass run channel to the outer panel of the vehicle door frame.
Figure 17:
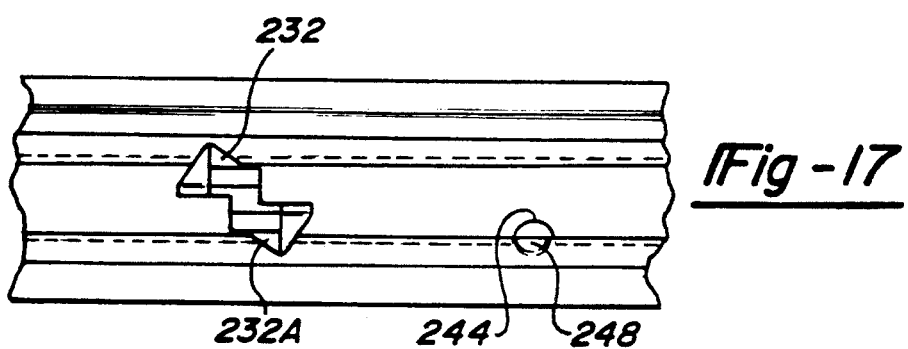
FIG. 17 is a top view illustrating the fastening clip extending from the track, with the metallic core crimped against the track.

The fasteners 226 typically include a shaft portion 228 which has a rectangular cross-section and an axis A-A. Extending from the shaft portion 228 is a head portion 230 otherwise referred to as a locking protrusion. The head portion 230 includes at least a single ramp surface offset from the axis A-A which provides for rotational deflection of the head when inserted through an aperture such as that illustrated in FIG. 16. In a preferred embodiment the head portion 230 includes a first ramp surface 232 and a second ramp surface 232A as is best illustrated in FIG. 17. The ramp surfaces, while they may be of many configurations, are preferably formed into solid pyramidal oblique triangular slopes and have a greater thickness at the base portion for forming locking sleeves 234 and 234A and gradual tapering to a relative points 236 and 236A. Thus the ramp surfaces 232 and 232A are formed by an edge of the pyramidal shaped head. Below the ramp surfaces of the head are locating members 238 and 238A diametrically spaced which include locating surfaces 240 and 240A disposed along the bottom edge thereof. The locating surfaces 240 and 240A, engage the outer panel 60 when the fasteners 226 extend through the aperture 64. Also provided are outermost edges 242 and 242A which provide a locating feature if narrow apertures are utilized along the outer panel.

As previously noted the ramp surfaces 232 and 232A are angled and offset from the axis A-A such that relative movement of the fasteners 226 in an axial direction into the aperture 250 engages these surfaces and provides rotational deflection of the protrusion, thereby rotationally twisting the shaft portion 228. Typically, the angular orientation of the ramp surfaces are from between about 3° to about 20° and preferably from about 7° to 10° to provide optimum deflection with minimum pressure on the track 224. The ramp surfaces are configured such that a plane passing through the ramp member is non-coplanar with a plane drawn through the axis of the shaft. It should be readily apparent to those skilled in the art that the tool illustrated in co-pending U.S. patent application Ser. No. 08/227,065 can be utilized in association with the present invention to remove the fasteners from the outer panel.

To retain the track 224 within the C-shaped slot 54 as illustrated with reference to FIG. 16, the track is slid into the slot 54 along a free end of the glass run channel 14 either prior to molding the corner portion or from the opposite end at any time after the glass run channel is formed. The track 224 is typically provided with a plurality of detents 244 along either edge 246 or 246A of the track which serve as locators for crimping the metallic core to fill the detents along one edge as illustrated in FIG. 17 at reference numeral 248. This crimping precludes movement of the track within the slot thereby assuring accuracy in alignment of the glass run 14 channel upon attachment to the outer panel 60. While the detents are provided for both left and right handed attachment of the track 224 within slot 54, it is preferred that the crimping occur along the edge facing the inner edge to prevent against the possibility of show through on the outer show surface.

Figure 5:
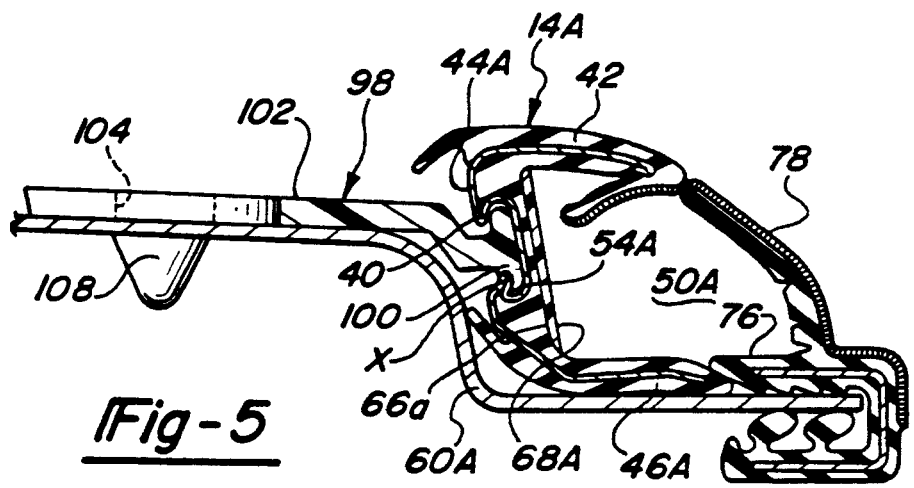
FIG. 5 is a cross sectional view taken along line 5—5 of FIG. 2 demonstrating the window seal assembly mounted along the "A" pillar of the automotive vehicle door window opening.
Figure 6:
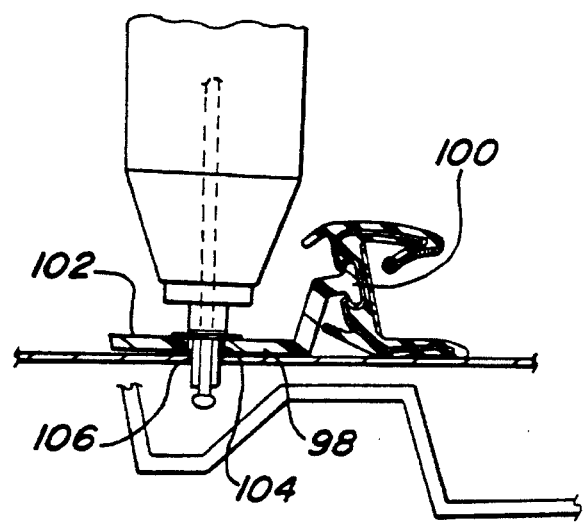
FIG. 6 is a sectional side view demonstrating the attachment of a mounting clip along the upper A pillar.
Figure 7:
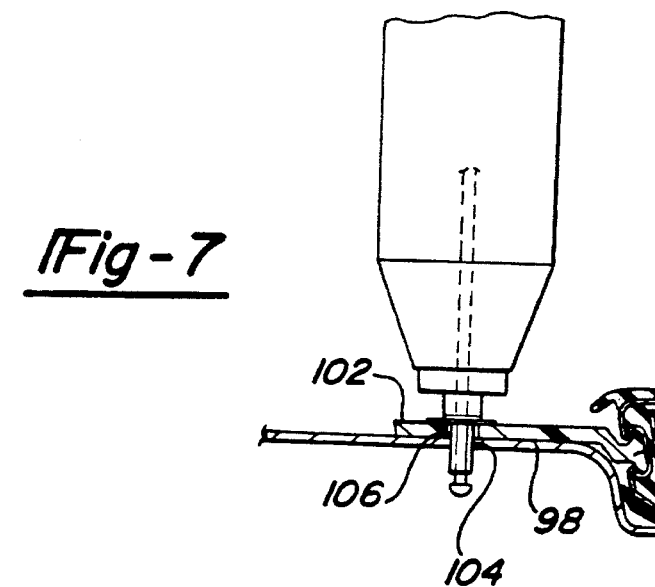
FIG. 7 is a sectional side view demonstrating the attachment of a mounting clip along the upper A pillar.

As shown in FIG. 5 a cross-sectional view taken along line 5—5 of FIG. 2 demonstrating the window seal assembly 10 mounted along the A pillar section of the vehicle door window opening is also provided. The glass run channel portion 14A disposed along the A pillar is substantially similar to that of the B pillar section as shown in FIG. 3 except that the glass run channel portion 14A is attached to the vehicle door frame generally with one or more rigid clips 98 rather than a plurality of fasteners. Of course, while use of the clip to be described below is preferred along the A pillar, it should be understood by those skilled in the art that the structure of the glass run channel lends itself to attachment along the A pillar through the use of a plurality of fasteners as well.

The clip 98 includes an elongated head portion 100 which is slid into the C-shaped slot 54A prior to extruding the corner material which connects the A pillar 24 to the header portion 28. Once positioned at the desired location along the A pillar the metallic support core 40 is crimped at least once along the slot 54 as indicated by reference letter to retain the clip in position. The clip 98 is then positioned adjacent the outer panel 60A such that the apertures 104 contained along the body 102 of the clip are aligned with apertures 106 provided along the outer panel as shown more clearly in FIGS. 6 and 7. As demonstrated in FIGS. 6 and 7, studs 108 are then inserted through the apertures 104 and 106, respectively, to lock the clip 98 to the outer panel. Once the glass run channel 14A is attached to the outer panel along the window opening, the inner flock seal 16 can be positioned over the flange as will be described in greater detail below. Preferably the back wall 66A of the glass run channel's web 44A is coated with a layer 68A of high molecular weight polyethylene.

Figure 4:
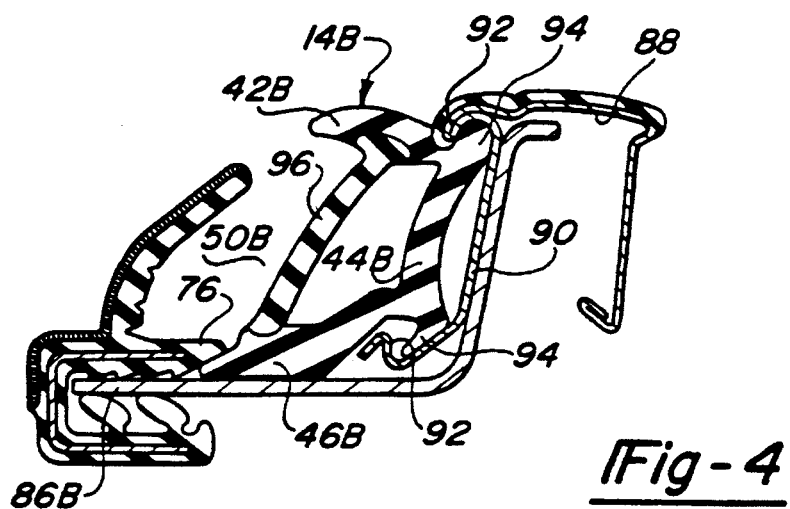
FIG. 4 is a cross section view taken along line 4—4 of FIG. 2 demonstrating the window seal assembly mounted along the header portion of the automotive vehicle door window opening.

Turning to FIG. 4 a cross-sectional view taken along line 4—4 of FIG. 2 demonstrating the window seal assembly 10 mounted along the header portion 28 of the door window opening 22 is provided. The glass run channel 14B along the header portion 28 has a modified construction as compared to the A, B and C pillar portions. Likewise, the window opening is modified along this header section 28 to include a flange 88 having a C-shaped channel portion 90 which is spot welded or otherwise attached to the vehicle door frame 60 as is known in the art. The C-shaped channel portion 90 is provided with incurved ends 92 which serve to retain the projections 94 extending outwardly along each end of the web 44B of the glass run channel 14B. Preferably, a band 96 of sponge-like material is provided which extends across the first and second legs 46B and 42B, respectively, of the glass run channel 14B substantially parallel and spaced away from the web 44B within the window receiving channel. The band 96 generally serves to prevent excessive closure of the window pane within the window opening.

The continuous inner flock seal 16 as shown in FIGS. 3–5 is substantially U-shaped in cross-section and includes a metallic core 70 and an extruded layer of an elastomeric material such as EPDM rubber. The U-shaped portion 72 of the inner flock seal 16 is positioned onto the flange 86 such that the first leg 74 engages the first legs 46, 46A and 46B of the respective glass run channel pillar portions in a partially overlapping manner. Extending from the outer surface 76 of inner flock seal along the first leg 74 is an elongated rib 78. The elongated rib 78 extends across the window receiving channel 50 to engage the ribs 48, 48A and 48B of the respective glass run channel pillar portions. Preferably the rib 78 of the inner flock seal is coated with flocking material. Extending from the inner surface 80 of both the first and second legs 74 and 82, respectively, of the inner flock seal 16 are a plurality of gripping fins 84 which assist in retaining the inner flock seal 16 over the door flange 86. It should be noted by those skilled in the art that the inner flock seal has a consistent cross-sectional configuration along its entire length.

Figure 8:
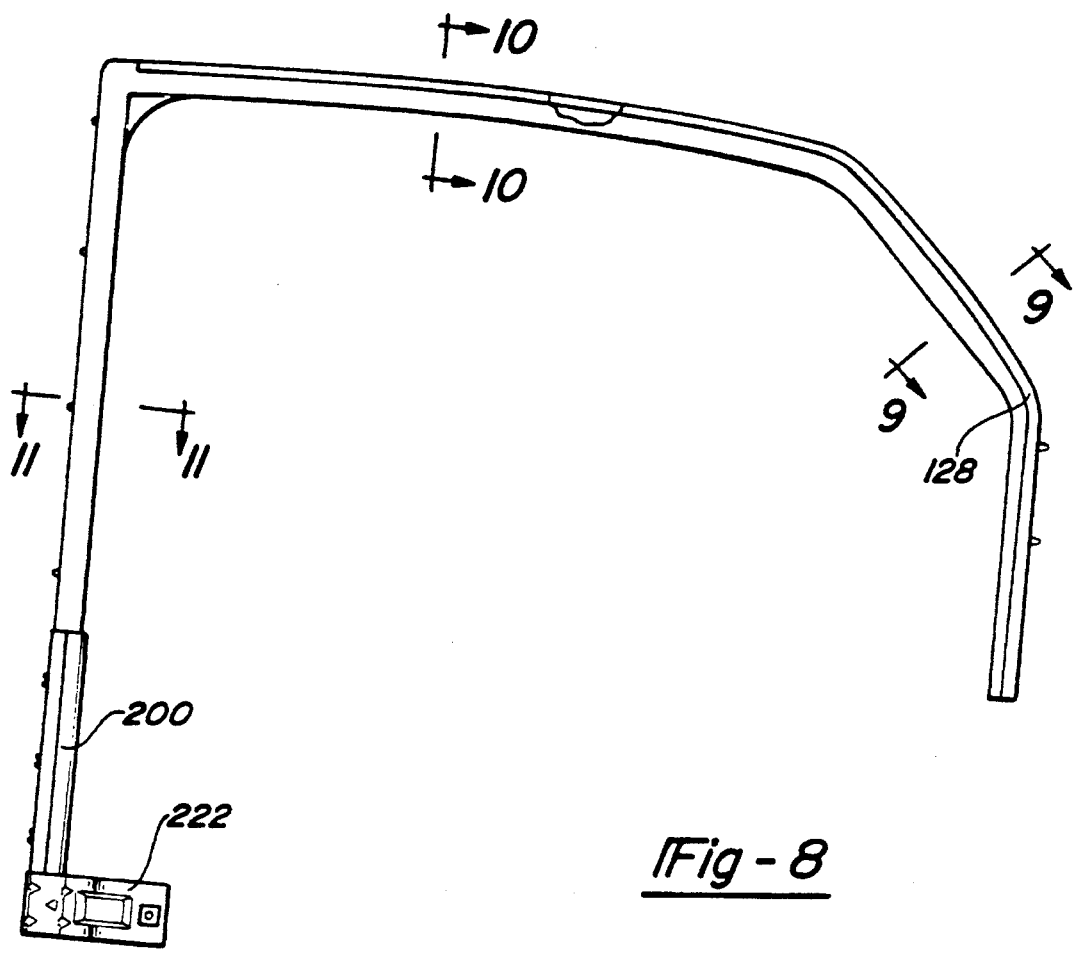
FIG. 8 is a side elevational view, partially cut away, of the window seal assembly for the rear door of an automotive vehicle.

Referring to FIGS. 8 through 11, a second embodiment particularly useful along the window opening of the automobiles rear door is shown. With particular reference to FIG. 8, a side elevational view, partially cut away, of the window seal assembly 110 is shown to include both a glass run channel 114 and an inner flock seal 116 which cooperate to seal the vehicle door window opening and window pane when the vehicle window is in a fully closed position.

Figure 9:
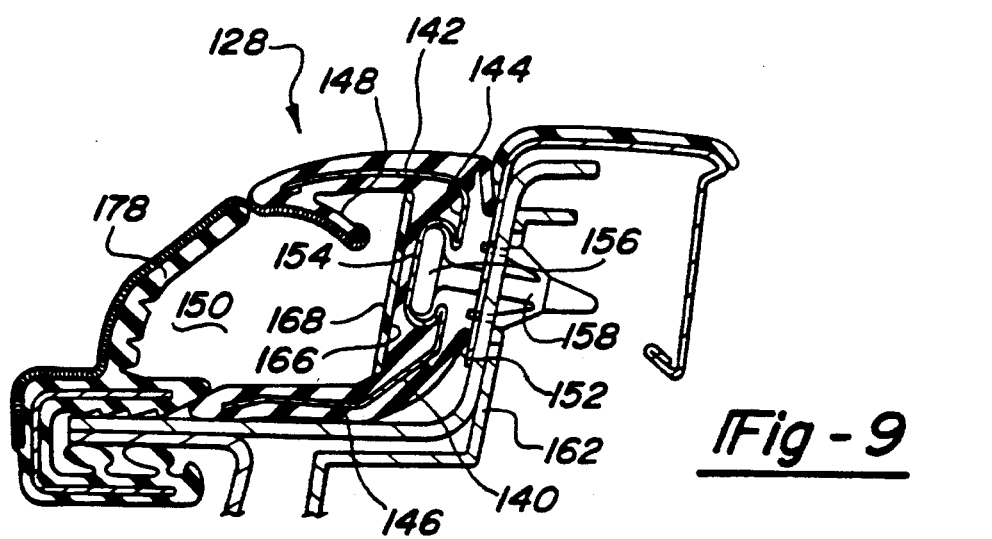
FIG. 9 is a cross sectional view taken along line 9—9 of FIG. 8 demonstrating the window seal: assembly mounted along the "C" pillar of the automotive vehicle door window opening.

Referring to FIG. 9, a cross-sectional view taken along line 9—9 of FIG. 8 is shown. The cross sectional representation illustrates the C pillar portion 128 of the present invention. Structurally, both the glass run channel 114 and the inner flock seal 116 along the C pillar are substantially identical to the glass run channel and inner flock seal illustrated in FIG. 3. The only difference is in the structure of the vehicle doors window opening. The door frame along the window openings C pillar portion as illustrated in FIG. 9 includes an outer panel 160, a partially contiguous inner panel 162 and a door top molding core 164 through which the fasteners 158 extend to retain the glass run channel portion 114.

The glass run channel portion 114 of the C pillar portion includes a support core 140 which is embedded within an elastomeric cover such as, for example, EPDM rubber or another elastomeric or polymeric material. The support core includes a first, inner leg 146, a web 144 and a second, outer leg 142 which define the glass run channel. Glass run channel 114 has a conventional elastomeric glass run rib 148 which extends from the outer leg 142 into the window pane receiving channel 150. The portion of elastomeric cover extending beyond the web 144 away from the inner and outer legs includes conventional sealing lips 152.

Disposed along the web 144 is a C-shaped slot 154 formed in the support core 140 for retaining the head 156 of the fasteners 158. Preferably, a plurality of fasteners 158 are utilized to mechanically fasten the glass run channel to the outer panel 160 of the vehicle door frame. Again, the fastener heads 156 are slid into the slot 154 prior to extruding the corner portion of the glass run channel which connects the C pillar to the header portion. As the glass run channel is positioned contiguously against the outer panel the fasteners 158 are inserted through the aligned apertures contained on the inner and outer panels 162 and 160 and the door top molding 164.

Preferably, the backing wall 166 of the window receiving channel 150 is coated with a layer of polymeric material 168 such as, for example, high molecular weight polyethylene to decrease friction during movement of the window pane and to enhance the overall wearability of the glass run channel.

Figure 10:
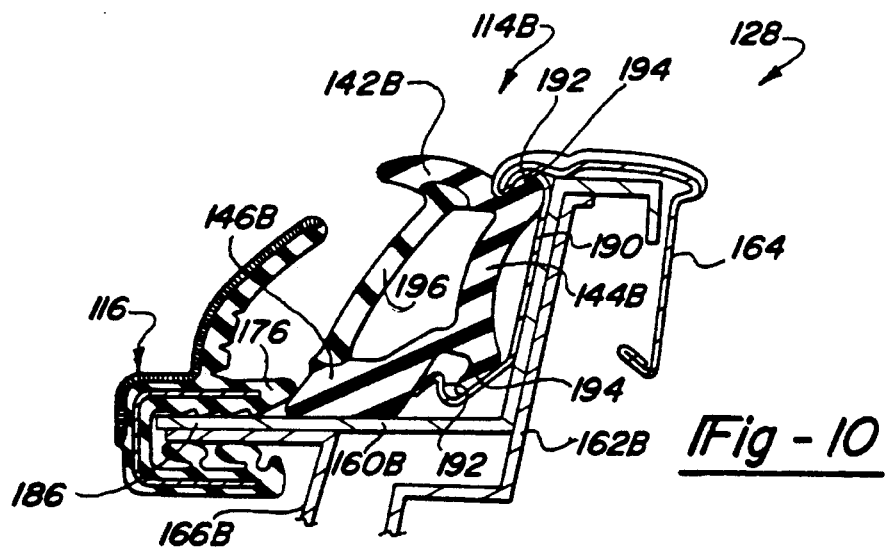
FIG. 10 is a cross sectional view taken along line 10—10 of FIG. 8 demonstrating the window seal assembly mounted along the header portion of the automotive vehicle door window opening.

With regard to the header portion 128, as illustrated in FIG. 10, the only real difference between this embodiment and the one disclosed in FIG. 4 is that the structure of the window opening along the vehicle door frame includes in addition to the outer panel 160B and an inner panel 162B, a metallic door top molding core 164B with an integral C-shaped channel and a spacer 166B which extends between the inner and outer panels.

As illustrated in FIG. 10 the header portion 128 of the glass run channel 114B also has a modified construction compared to the A, B and C pillar portions. The substantially C-shaped channel portion 190 of the door top molding core 164B is provided with incurved ends 192 which serve to retain the projections 194 extending outwardly along each end of the web 144B of the glass run channel 114B. Again, a band 196 of sponge-like material is provided which extends across the first and second legs 142B and 146B, respectively, of the glass run channel 114B substantially parallel and spaced away from the web 144B within the window receiving channel.

Referring to FIG. 11, a cross sectional view taken along line 11—11 of FIG. 8 demonstrating the second window seal embodiment mounted along the B pillar portion of the window opening is provided. The window seal assembly is substantially identical to the B pillar portion as described with reference to FIG. 3.

The glass run channel 114 of the B pillar portion generally comprises a support core 140 made from stainless steel or aluminum which is embedded within an elastomeric cover. The core is substantially U-shape including a first, inner leg 146, a web 144 and a second, outer leg 142 which defines the glass run channel 114. Glass run channel 114 has a conventional glass run rib 148 which extends into window pane receiving channel 150. The portion of elastomeric cover extending past the web 144 includes conventional sealing lips 152 along each end. Disposed along the web 144 is a C-shaped channel 154 formed in the support core 140 for retaining the head 156 of at least one fastener 158. Once the heads of the fasteners are slid into the slot, the wings 162 are inserted through the apertures contained along the door frame.

As with the inner flock seal 16 as illustrated in FIGS. 3–5, the inner flock seal 116 as shown in FIGS. 9–11 includes a substantially U-shaped portion 172 which includes a metallic core 170 coated with an elastomeric material. The U-shaped portion 172 of the inner flock seal 116 is positioned onto the flange 186 such that a first leg 174 engages the first legs 146, 146A and 146B of the glass run channel pillar portions in a partially overlapping manner. Extending from the outer surface 176 of inner flock seal along the first leg 174 is an elongated rib 178. The elongated rib 178 extends across the window receiving channel 150 to engage the ribs 148 and 148A of the glass run channel pillar portions. Preferably the rib 178 of the inner flock seal is coated with flocking material. Extending from the inner surface of both the first and second legs 174 and 182, respectively, of the inner flock seal 116 are a plurality of gripping fins 184 which assist in retaining the inner flock seal 116 over the door flange 186. Again, as with the inner flock seal 16 illustrated in FIGS. 3–5, it should be noted that the inner flock seal 116 is a continuous length mounted over the flange along both the B and C pillar sections as well as along the header portion.

Referring to FIG. 12 a cross sectional view illustrating the bracket 200 shown in FIGS. 2 and 8 as used to secure the glass run channel adjacent the vehicle door frame below the vehicle belt line is provided. It should be understood by those skilled in the art that the bracket 200 can be disposed at the end of the glass run channel along all three of the pillar portions. Thus, while the bracket assembly will be described with regard to the B pillar section 26 it should be clear to those skilled in the art that the brackets disposed along the other pillar sections are identical.

The bracket 200 is an elongated member including a single metallic structure having two integral U-shaped sections 202 and 204, respectively. The first, wider U-shaped section 202 envelops the inner and outer legs 46 and 42, respectively, and the web 44 of the glass run channel 14. Preferably the first and second legs 206 and 208 of the metallic bracket are bent slightly inwardly to preclude separation of the glass run channel from the bracket. Additionally, the web portion 21 0 of the metallic bracket is provided with a plurality of criss-crossed tabs 212 and 212A spaced apart along the length of the bracket 200 which extend into the slot 54 and engage the metallic support core 40 of the glass run channel 14 to further preclude separation of the glass run channel from the bracket.

The second more narrow U-shaped channel 204 hosts an umbrella seal 214. The stem 216 of the umbrella seal 214 is disposed within the narrower U-shaped channel and the elongated rib portion 220 which extends from the umbrella cap 218 extends substantially across the window receiving channel 50 to lock under the rib 48 of the glass run channel. Preferably, the elongated rib 48 is provided with flocking as is known in the art. Disposed along the bottom of each bracket 202 is a metallic plate 222 as shown in FIG. 8 which is mechanically attached to the vehicle door frame below the belt-line of the vehicle door.

Figure 14:
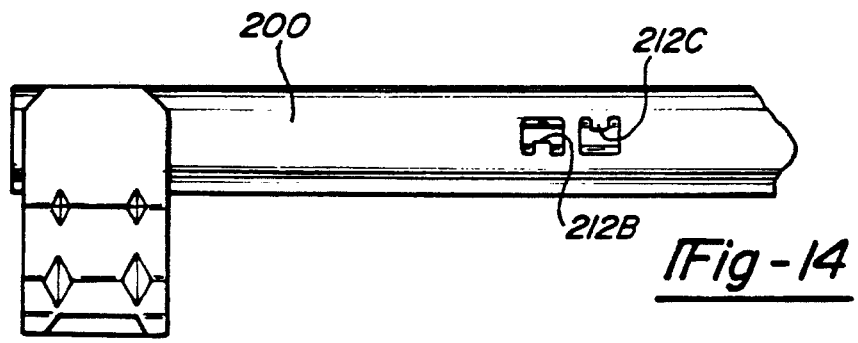
FIG. 14 is a rear view of the bracket of FIG. 12 illustrating the arrangement of tabs for retaining the base of the glass run channel.
Figure 15:
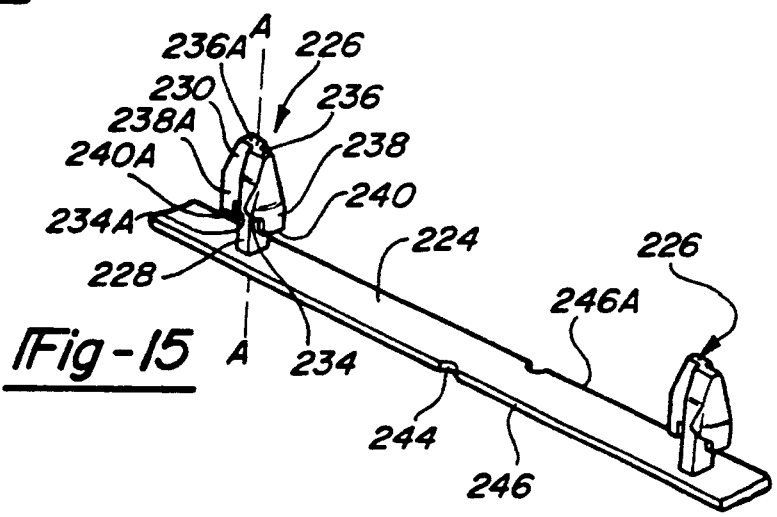
FIG. 15, is a perspective view illustrating a section of a track member incorporating a plurality of spaced apart specially designed fastening clips for securing the glass in channel to outer panel of the vehicle door frame.

As illustrated in FIGS. 13 and 14 the metallic bracket 200 may also include a plurality of incurved opposing tabs 212B and 212C instead of the criss-crossed tabs illustrated in FIG. 11. Again, the tabs 212B and 212C extend into the slot 54 and engage the metallic core to further preclude separation of the glass run channel from the bracket.

The invention has been described in an illustrative manner, and it is to be understood that the terminology which has been used is intended to describe the invention in a non-limiting manner. The invention as described therefore constitutes the preferred embodiments of the present invention, and it should be appreciated that the invention is susceptible to modification, variation and change without departing from the proper scope and fair meaning of the accompanying claims.

What is claimed is:

1. A window sealing assembly attachable to a vehicle door including a flange portion for sealing a movable pane of window glass comprising:

an elastomeric glass run channel attachable to said vehicle door including an embedded rigid reinforcing core having an elongated slot for retaining fastening means for attaching the glass run channel to said vehicle door.

2. The window sealing assembly of claim 1, wherein said rigid reinforcing core is substantially U-shaped including first and second legs separated by a core web to provide a window receiving channel, said elongated slot extending into the window receiving channel and having an overall C-shaped for retaining the head of said fastening means.

3. The window sealing assembly of claim 2, wherein said window receiving channel includes a layer of high density polyethylene bonded to the elastomeric material, whereby the high density polyethylene layer serves to reduce friction during movement of the window panel.

4. The window sealing assembly of claim 2, further comprising a bracket member mounted over a portion of the glass run channel, said bracket member including alternately bent tabs which extend into the elongated slot to preclude separation of the bracket member from the glass run channel and means for fastening the bracket member to the flange portion of said vehicle door.

5. The window sealing assembly of claim 4, wherein said bracket member is substantially U-shaped with inwardly bent first and second legs, said glass run channel being disposed within the bracket member such that the first and second legs of said glass run channel are pinched by said bracket member.

6. The window sealing assembly of claim 4, wherein said means for fastening the bracket member to the flange portion of said door includes an extending plate which is fastened to the flange.

7. The window sealing assembly of claim 1, further comprising a continuous interlock seal, said interlock seal including a rigid substantially U-shaped reinforcing core coated with an elastomeric material, said core having first and second legs separated by a web, wherein the first leg of said continuous interlock seal at least partially overlaps a portion of said glass run channel.

8. The window sealing assembly of claim 1, wherein said fastening means for attaching the glass run channel to the vehicle door includes a plurality of spaced apart fasteners.

9. The window sealing assembly of claim 8, wherein said plurality of spaced apart fasteners extend from an elongated track, said elongated track herein disposed within said elongated slot.

10. The window sealing assembly of claim 9, wherein said fasteners further comprise:

a base portion and a shaft portion having an axis connected to said base portion, said shaft portion adapted for resilient rotational deflection about said axis; and a locking protrusion extending from said shaft portion including a locking member for engaging said vehicle door and a ramp portion operable for rotating said locking protrusion upon insertion of said protrusion through an aperture provided on the vehicle door.

11. The window sealing assembly of claim 1, wherein said fastening means for attaching the glass run channel to said vehicle door includes at least one clip.

12. A window sealing assembly attachable to a vehicle door for sealing a movable pane of window glass, comprising:

a substantially U-shaped elastomeric glass run channel including at least one pillar portion and at least one header portion, said at least one pillar portion including a rigid U-shaped reinforcing core including first and second legs separated by a web portion, said web portion including an elongated slot for retaining fastening means for attaching the glass run channel to the vehicle door, said header portion including a substantially U-shaped channel including first and second legs separated by a web portion; and an elastomeric interlock seal including a rigid reinforcing core having first and second legs separated by a web portion to form a U-shaped channel, said interlock seal being disposed over a vehicle door flange such that the first leg of said interlock seal at least partially overlaps the first leg of said glass run channels pillar and header portions.

13. The window sealing assembly of claim 12, wherein the window receiving channel includes an outer layer of high density polyethylene bonded to the elastomeric material, whereby the high density polyethylene layer serves to reduce friction during movement of the window pane.

14. The window sealing assembly of claim 12, wherein said elongated slot is substantially C-shaped.

15. The window sealing assembly of claim 12, further comprising a bracket member mounted over a portion of the glass run channel, said bracket member including alternately bend tabs which extend into the elongated slot to preclude separation of the bracket member from the glass run channel and means for fastening the bracket member to the vehicle door flange.

16. The window sealing assembly of claim 15, wherein said bracket member is substantially U-shaped with inwardly bent first and second legs, said glass run channel being disposed within the bracket member such that the first and second legs of said glass run channel are pinched by said bracket member.

17. The window sealing assembly of claim 15, wherein said means for fastening the bracket member to the vehicle door flange includes an extending plate which is fastened to the vehicle door flange.

18. The window sealing assembly of claim 12, wherein said means for attaching the glass run channel to the vehicle door includes a plurality of spaced apart fasteners.

19. The window sealing assembly of claim 18, wherein said plurality of spaced apart fasteners extend from an elongated track, said elongated track being disposed within said elongated slot.

20. The window sealing assembly of claim 19, wherein said fasteners further comprise:

a base portion and a shaft portion having an axis connected to said base portion, said shaft portion adapted for resilient rotational deflection about said axis; and a locking protrusion extending from said shaft portion including a locking member for engaging said vehicle door and a ramp portion operable for rotating said locking protrusion upon insertion of said protrusion through an aperture provided on the vehicle door.

21. The window sealing assembly of claim 20, wherein said ramp portion is offset from said axis for providing the resilient rotational deflection of said locking protrusion.

22. The window sealing assembly of claim 20, wherein said locking protrusion further comprises a first ramp surface and a second ramp surface terminating at a pair of respective locking members, said ramp surfaces being offset from said axis of said protrusion.

23. The window sealing assembly of claim 20, wherein said ramp portion includes a ramp edge and a plane passing through said ramp member which is non-coplanar with the plane drawn through the axis of said shaft portion.

24. The window sealing assembly of claim 23, wherein said plane passing through said ramp edge intersects the plane passing through said axis.

25. A fastening member for attaching a glass run channel including a supporting core to a vehicle door window opening, said fastening member comprising:

an elongated track having a plurality of fasteners extending therefrom, said plurality of fasteners including a base portion, a shaft portion and a locking protrusion extending from the shaft portion; and means for positioning said elongated track relative to said supporting core, said means including at least one detent located along said track which receives a crimped portion of said supporting core to lock said fastening member in place.

26. The fastening member of claim 25, wherein said elongated track includes a plurality of detents located along at least one edge of said track, whereby said detents receive crimped portions of the supporting core to lock said fastening members in place.

* * * * *